United States Patent
Kumagai et al.

(10) Patent No.: US 10,471,984 B2
(45) Date of Patent: Nov. 12, 2019

(54) ELECTRONIC CONTROL UNIT AND ELECTRIC POWER STEERING APPARATUS EQUIPPED WITH THE SAME

(71) Applicants: NSK Ltd., Tokyo (JP); TOSHIBA ELECTRONIC DEVICES & STORAGE CORPORATION, Tokyo (JP)

(72) Inventors: Shin Kumagai, Tokyo (JP); Nobuhiko Ando, Tokyo (JP); Kyosho Uryu, Tokyo (JP); Takahiro Yamazaki, Tokyo (JP)

(73) Assignees: NSK LTD., Shinaeawa-ku, Tokyo (JP); TOSHIBA ELECTRONIC DEVICES & STORAGE CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/776,907

(22) PCT Filed: Nov. 22, 2016

(86) PCT No.: PCT/JP2016/084602
§ 371 (c)(1),
(2) Date: May 17, 2018

(87) PCT Pub. No.: WO2017/090612
PCT Pub. Date: Jun. 1, 2017

(65) Prior Publication Data
US 2018/0339726 A1   Nov. 29, 2018

(30) Foreign Application Priority Data
Nov. 24, 2015  (JP) .................................. 2015-229025

(51) Int. Cl.
*B62D 5/04*   (2006.01)
*H02P 27/06*  (2006.01)
(Continued)

(52) U.S. Cl.
CPC ......... *B62D 5/0463* (2013.01); *B62D 5/0421* (2013.01); *B62D 5/0493* (2013.01);
(Continued)

(58) Field of Classification Search
CPC .. B62D 5/0463; B62D 5/0493; B62D 5/0421; B62D 6/00; G06F 11/30; H02M 7/48;
(Continued)

(56) References Cited

U.S. PATENT DOCUMENTS 6,335,893 B1 * 1/2002 Tanaka ................... G11C 5/145
                                                257/E27.097
6,373,217 B1 * 4/2002 Kawada ............... B62D 5/0463
                                                180/443

(Continued)

FOREIGN PATENT DOCUMENTS

JP    2002-332909 A    11/2002
JP    2003-026024 A     1/2003
(Continued)

OTHER PUBLICATIONS

International Search Report of PCT/JP2016/084602 dated Feb. 14, 2017 [PCT/ISA/210].

*Primary Examiner* — Russell Frejd
(74) *Attorney, Agent, or Firm* — Sughrue Mion, PLLC

(57) ABSTRACT

An electronic control unit where an external watch dog timer (WDT) can always normally detect an abnormality (a failure) to a micro controller unit (MCU) related to a built-in self-test (BIST) function and which can maintain safety of a system. The control unit includes an external WDT to detect an abnormality of the MCU, a reset circuit to reset the MCU when the external WDT detects the abnormality of the MCU, and an ON/OFF control section to turn a gate of the semiconductor switching device on or off in accordance with the external WDT. The inverter is stopped by turning the (Continued)

gate off via the ON/OFF control section when the external WDT is a disable state. When the abnormality of the MCU is not detected in an enable state, the inverter is driven by turning the gate on via the ON/OFF control section. When the abnormality of the MCU is detected, the inverter is stopped by turning the gate off via the ON/OFF control section and the MCU is reset by the reset circuit.

4 Claims, 6 Drawing Sheets

(51) Int. Cl.
    *H02M 7/48*     (2007.01)
    *B62D 6/00*     (2006.01)
    *G06F 11/30*     (2006.01)
    *H02M 1/32*     (2007.01)
    *H02M 7/5387*     (2007.01)
    *H02P 29/024*     (2016.01)

(52) U.S. Cl.
    CPC ............ *B62D 6/00* (2013.01); *G06F 11/30* (2013.01); *H02M 1/32* (2013.01); *H02M 7/48* (2013.01); *H02M 7/53873* (2013.01); *H02P 27/06* (2013.01); *H02P 29/0241* (2016.02)

(58) Field of Classification Search
    CPC ..... H02M 1/32; H02M 7/53873; H02P 27/06; H02P 29/0241
    See application file for complete search history.

(56) References Cited

U.S. PATENT DOCUMENTS

| | | | |
|---|---|---|---|
| 6,381,528 B1* | 4/2002 | Kawada | B62D 5/0493 |
| | | | 180/443 |
| 6,535,435 B2* | 3/2003 | Tanaka | G11C 5/145 |
| | | | 257/E27.097 |
| 2002/0177932 A1 | 11/2002 | Kifuku et al. | |
| 2016/0041860 A1* | 2/2016 | Mitsuishi | G06F 11/0721 |
| | | | 714/48 |

FOREIGN PATENT DOCUMENTS

| | | |
|---|---|---|
| JP | 2009-251680 A | 10/2009 |
| JP | 2015-153343 A | 8/2015 |

* cited by examiner

PRIOR ART

PRIOR ART

ELECTRONIC CONTROL UNIT AND ELECTRIC POWER STEERING APPARATUS EQUIPPED WITH THE SAME

CROSS REFERENCE TO RELATED APPLICATIONS

This application is a National Stage of International Application No. PCT/JP2016/084602, filed Nov. 22, 2016, claiming priority based on Japanese Patent Application No. 2015-229025, filed Nov. 24, 2015, the contents of all of which are incorporated herein by reference in their entirety.

TECHNICAL FIELD

The present invention relates to an electronic control unit, and in particular to an electric power steering apparatus that drives and controls a motor for assist-control of a vehicle by a micro controller unit (MCU) (a central processing unit (CPU), a micro processing unit (MPU), a microcomputer, or the like) via an inverter which is constituted by field effect transistor (FET) bridges as semiconductor switching devices. The present invention also relates to the electronic control unit that comprises the MCU having a built-in self-test (BIST) (a self-diagnostic circuit) function or cooperates with an external circuit having the BIST function, ON/OFF-controls gates of the semiconductor switching devices (for example, the FETs) by detecting an abnormality (a failure) of the MCU by means of a watch dog timer (WDT) which is disposed in the external, and maintains safety of a system by stopping the driving of the inverter by turning the gate off even when the MCU is abnormal.

BACKGROUND ART

An electric power steering apparatus (EPS) which is equipped with an electronic control unit and provides a steering system of a vehicle with a steering assist torque (an assist torque) by means of a rotational torque of a motor, applies the steering assist torque to a steering shaft or a rack shaft by means of a transmission mechanism such as gears or a belt through a reduction mechanism. In order to accurately generate the steering assist torque, such a conventional electric power steering apparatus performs a feedback control of a motor current. The feedback control adjusts a voltage supplied to the motor so that a difference between a steering assist command value (a current command value) and a detected motor current value becomes small, and the adjustment of the voltage applied to the motor is generally performed by an adjustment of a duty of a pulse width modulation (PWM) control. The motor is driven and controlled by the inverter which is constituted by FET bridges as semiconductor switching devices.

A general configuration of the conventional electric power steering apparatus will be described with reference to FIG. 1. As shown in FIG. 1, a column shaft (a steering shaft or a handle shaft) 2 connected to a handle (a steering wheel) 1 is connected to steered wheels 8L and 8R through reduction gears 3, universal joints 4a and 4b, a rack-and-pinion mechanism 5, and tie rods 6a and 6b, further via hub units 7a and 7b. In addition, the column shaft 2 is provided with a torque sensor 10 for detecting a steering torque Th of the steering wheel 1 and a steering angle sensor 14 for detecting a steering angle θ, and a motor 20 for assisting a steering force of the steering wheel 1 is connected to the column shaft 2 through the reduction gears 3. The electric power is supplied to a control unit (ECU) 30 for controlling the electric power steering apparatus from a battery 13 as a power supply, and an ignition key (IG) signal is inputted into the control unit 30 through an ignition key 11. The control unit 30 calculates a current command value of an assist-control on the basis of the steering torque Th detected by the torque sensor 10 and a vehicle speed Vel detected by a vehicle speed sensor 12, and controls a current supplied to the motor 20 by means of a voltage control command value Vref obtained by performing compensation or the like to the calculated current command value. The steering angle θ can be obtained from a rotational sensor connected to the motor 20.

A controller area network (CAN) 40 to send/receive various information and signals on the vehicle is connected to the control unit 30, and it is also possible to receive the vehicle speed Vel from the CAN 40. Further, a non-CAN 41 is also possible to connect to the control unit 30, and the non-CAN 41 sends and receives a communication, analogue/digital signals, electric wave or the like except for the CAN 40.

In such an electric power steering apparatus, the control unit 30 mainly comprises an MCU (including a CPU, an MPU and the like), and general functions performed by programs within the MCU are, for example, shown in FIG. 2. Functions and operations of the control unit 30 will be described with reference to FIG. 2. The steering torque Th from the torque sensor 10 and the vehicle speed Vel from the vehicle speed sensor 12 (or from the CAN 40) are inputted into a current command value calculating section 31. The current command value calculating section 31 calculates a current command value Iref1 based on the steering torque Th and the vehicle speed Vel using an assist map or the like. The calculated current command value Iref1 is added with a compensation signal CM for improving characteristics from a compensating section 34 at an adding section 32A. The current command value Iref2 after the addition is limited of the maximum value thereof at a current limiting section 33. The current command value Irefm limited of the maximum value is inputted into a subtracting section 32B, whereat a detected motor current value Im is subtracted from the current command value Irefm.

The subtraction result I(=Irefm−Im) in the subtracting section 32B is proportional-integral-controlled (PI-controlled) at a PI-control section 35. The voltage control command value Vref obtained by the PI-control and a modulation signal (a carrier) CF are inputted into a PWM-control section 36, whereat a duty thereof is calculated. The motor 20 is PWM-driven by an inverter 37 with a PWM signal calculated the duty. The motor current value Im of the motor 20 is detected by a motor current detection means 38 and is inputted into the subtracting section 32B for the feedback.

The compensating section 34 adds a self-aligning torque (SAT) detected or estimated and an inertia compensation value 342 at an adding section 344. The addition result is further added with a convergence control value 341 at an adding section 345. The addition result is inputted into the adding section 32A as the compensation signal CM, thereby to improve the control characteristics.

In a case that the motor 20 is a three-phase brushless motor, details of the PWM-control section 36 and the inverter 37 have a configuration as shown in FIG. 3, and the PWM-control section 36 comprises a duty calculating section 36A that is within the MCU and calculates duty signals D1 to D6 which are used in a three-phase PWM-control by using the voltage control command value Vref in accordance with a predetermined equation, and a gate driving section 36B that drives the gates of the FETs as the semiconductor switching devices by means of the duty signals D1 to D6 and turns the gates on or off with compensating a dead time. The modulation signal (the carrier) CF is inputted into the duty calculating section 36A, and the duty calculating section 36A calculates the duty signals D1 to D6 of the PWM by synchronized to the modulation signal CF.

The inverter 37 is configured to the three-phase bridges of the upper stage FET 1 to FET 3 and the lower stage FET 4 to FET 6. The gate driving section 36B turns the FET 1 to the FET 6 on or off by means of the duty signals D1 to D6 of the PWM respectively, so that the motor 20 is driven. The FET 1 to the FET 6 are the FET with a back flow preventing parasitic diode.

A motor opening switch 23 is interposed between the inverter 37 and the motor 20 in order to interrupt a current supply when the assist-control is stopped and the like. The motor opening switch 23 comprises the FETs with the parasitic diode disposed to respective phases.

In such an electric power steering apparatus, conventionally, a system that detects the abnormality (including the failure) of the MCU is disclosed in, for example, an apparatus described in Japanese Unexamined Patent Publication No. 2003-26024 A (Patent Document 1). In Patent Document 1, as shown in FIG. 4, in order to prevent from dangerous operation when the MCU 100A is abnormal, a WDT 110 serving as the abnormal detecting circuit is disposed in the external of the MCU 100A, the WDT 110 outputs a reset signal RS when detecting the abnormality of the MCU 100A, and a reset circuit 120 that arranges a shape of the reset signal RS and resets the MCU 100A, is provided. The electric power from a power supply generating circuit 130 is supplied to the MCU 100A. The steering torque Th, the vehicle speed Vel, the steering angle θ and the like are inputted into the MCU 100A. The MCU 100A drives and controls the motor 20 by using the calculated duty signals D1 to D6 of the PWM for driving the FETs through the gate driving section 36B and the inverter 37.

The external WDT 110 inputs an abnormal detecting signal from the MCU 100A, outputs the reset signal RS in a case of detecting the abnormal signal, resets the MCU 100A through the reset circuit 120, and stops the MCU 100A and the system, so that the safety is secured.

THE LIST OF PRIOR ART DOCUMENTS

Patent Documents

Patent Document 1: Japanese Unexamined Patent Publication No. 2003-26024 A

SUMMARY OF THE INVENTION

Problems to be Solved by the Invention

However, the recent MCU with function safety has a safety function, and a hardware self-diagnostic function (a hardware BIST (a self-diagnostic circuit)) judging whether the safety function normally operates or not is incorporated in the MCU. There exists a restriction that a signal to the external WDT cannot be outputted while software cannot operate during executing the BIST. On the other hand, in a case that the external WDT operates while the BIST is executed, the signal from the MCU cannot be inputted, and then there is a possibility that the external WDT erroneously detects the abnormality of the MCU. It is required that the function of the external WDT is set to a disable state (Disable) while the BIST is executed.

In a case that the MCU is failed in starting when the function of the external WDT is the disable state considering that the BIST is executed in starting the MCU, there is a problem that the external WDT cannot detect the abnormality of the MCU and the possibility that the system reaches the dangerous operation exists.

The present invention has been developed in view of the above-described circumstances, and an object of the present invention is to provide an electronic control unit where an external WDT can always normally detect an abnormality (a failure) to an MCU having a BIST function or an MCU which cooperates with an external circuit having the BIST function and which can maintain safety of a system, and an electric power steering apparatus equipped with the electronic control unit.

Means for Solving the Problems

The present invention relates to an electronic control unit that is controlled by a micro controller unit (an MCU) via an inverter constituted by a semiconductor switching device, the above-described object of the present invention is achieved by that comprising: an external watch dog timer (an external WDT) to detect an abnormality of the MCU, a reset circuit to reset the MCU when the external WDT detects the abnormality of the MCU, and an ON/OFF control section to turn a gate of the semiconductor switching device on or off in accordance with the external WDT, wherein the inverter is stopped by turning the gate off via the ON/OFF control section when the external WDT is a disable state, and wherein when the abnormality of the MCU is not detected in an enable state to which the external WDT transits from the disable state, the inverter is driven by turning the gate on via the ON/OFF control section, and when the abnormality of the MCU is detected, the inverter is stopped by turning the gate off via the ON/OFF control section and the MCU is reset by the reset circuit.

The above-described object of the present invention is efficiently achieved by that wherein the MCU has a built-in self-test (BIST) function, or the MCU cooperates with an external circuit having the BIST function; or wherein the semiconductor switching device is a field effect transistor (an FET); or wherein the external WDT is initiated in the disable state, and transits to the enable state based on a pulse signal from the MCU; or wherein the external WDT comprises a control terminal for the disable state/the enable-state, and transits to the enable state by operating the control terminal from the MCU; or wherein the external WDT is initiated in the disable state, and transits to the enable state based on a serial peripheral interface (SPI) communication with the MCU.

The above-described object of the present invention is achieved by an electric power steering apparatus that is equipped with the above each electronic control unit.

Effects of the Invention

The electronic control unit of the present invention is provided with the external WDT which monitors the operation of the MCU having the BIST function or the MCU cooperating with the external circuit having the BIST function, drives the motor for the assist-control via the gate driving section constituted by the FET bridges and the inverter on the basis of the control signal from the MCU, and stops the inverter by outputting a driving stop signal to the gate driving section (a gate OFF signal) regardless of whether the abnormality (the failure) of the MCU occurs or not in a case that the external WDT is the disable state (Disable). The electronic control unit makes the external WDT transit from the disable state to the enable state (Enable) under the predetermined condition, it drives the inverter by outputting a gate ON signal in a case that the abnormality of the MCU is not detected when the external WDT is the enable state, and in a case that the abnormality of the MCU is detected when the external WDT is the enable state, it stops the inverter by outputting the gate OFF signal and resets the MCU. Thus, it is possible to maintain the safety of the system.

Since the output driver is stopped by turning the gate off even when the external WDT is the disable state (Disable) and the failure of the MCU occurs, the electronic control unit has the effect that the system can maintain the safety. The pulse signal having a constant period from the MCU or the like is used for judging whether a condition that the external WDT transits to the enable state (Enable) is satisfied or not. Since the external WDT can transit to the enable state (Enable) (release of the state of turning the gate off) by confirming that the MCU normally operates, the electronic control unit has the effect that the FET driving and the motor driving can be safely initiated.

MODE FOR CARRYING OUT THE INVENTION

The present invention is an electronic control unit that is controlled by an MCU via an inverter constituted by semiconductor switching devices. An electric power steering apparatus equipped with the electronic control unit PWM-drives and controls a motor by an MCU having a BIST function or an MCU cooperating with an external circuit having the BIST function, and applies an assist torque to a steering system of a vehicle. The inverter that is constituted by FET bridges as the semiconductor switching devices is used in driving the motor. The electronic control unit comprises an external WDT that detects an abnormality (including a failure) of the MCU, and an ON/OFF control section that turns gates of the respective FETs in the inverter on or off by using a signal from the external WDT. The inverter is stopped by turning the gates of the FETs off, regardless of whether the abnormality (including the failure) of the MCU occurs or not, in a case that the external WDT is a disable state (Disable). The external WDT transits from the disable state (Disable) to an enable state (Enable) when a predetermined condition is satisfied. In a case that the external WDT is the enable state and does not detect the abnormality of the MCU, the inverter is driven by turning the gates of the FETs on. In a case that the external WDT is the enable state and detects the abnormality of the MCU, the inverter is stopped by turning the gates of the FETs off and the MCU is reset. Thereby, the safety of the system can be maintained.

Hereinafter, an embodiment of the present invention will be described with reference to the accompanying drawings. In the present embodiment, the electric power steering apparatus equipped with the electronic control unit will be described.

Figure 1:
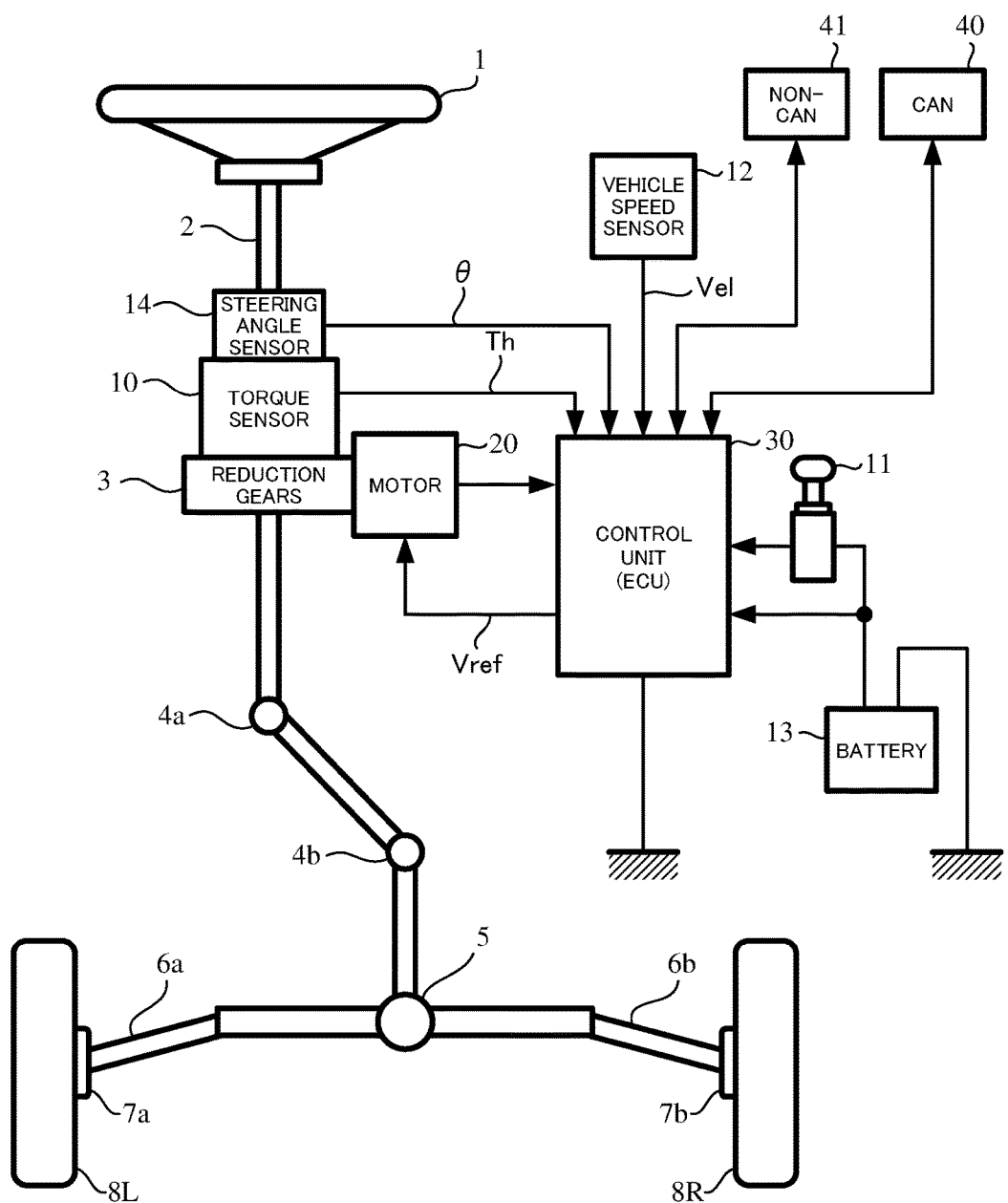
FIG. 1 is a configuration diagram showing a general outline of an electric power steering apparatus.
Figure 2:
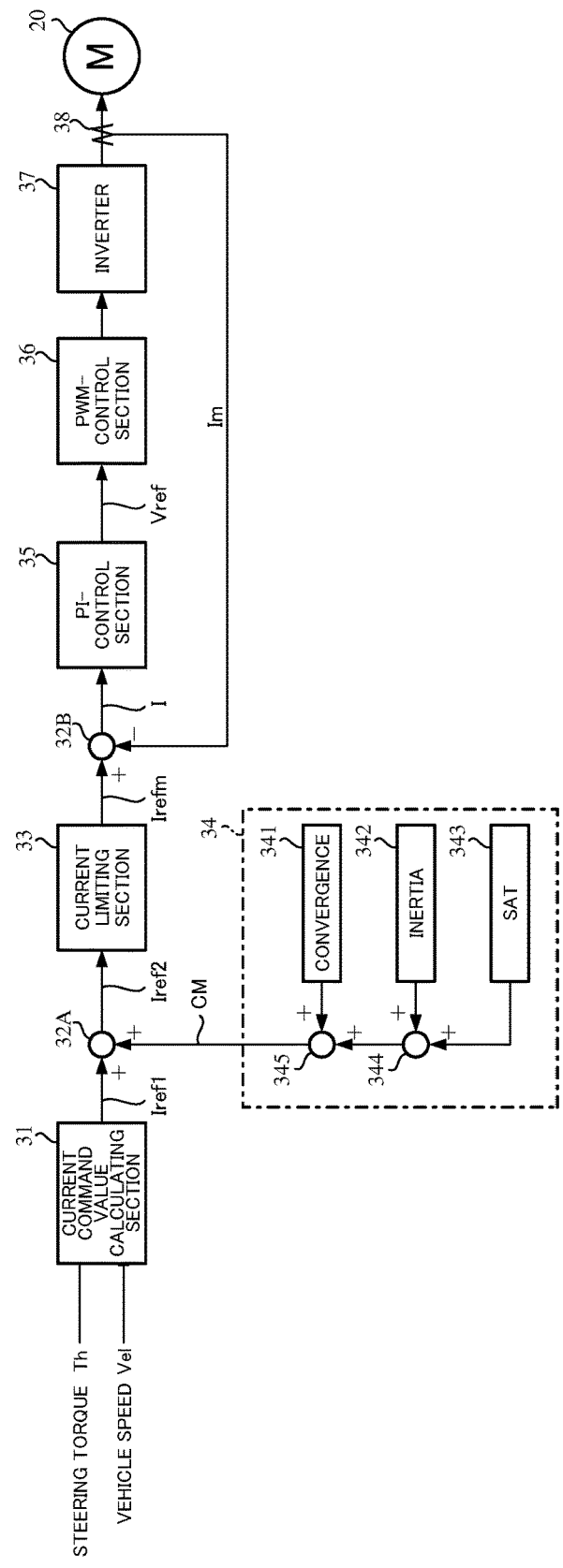
FIG. 2 is a block diagram showing a configuration example of a control system of the electric power steering apparatus.
Figure 3:
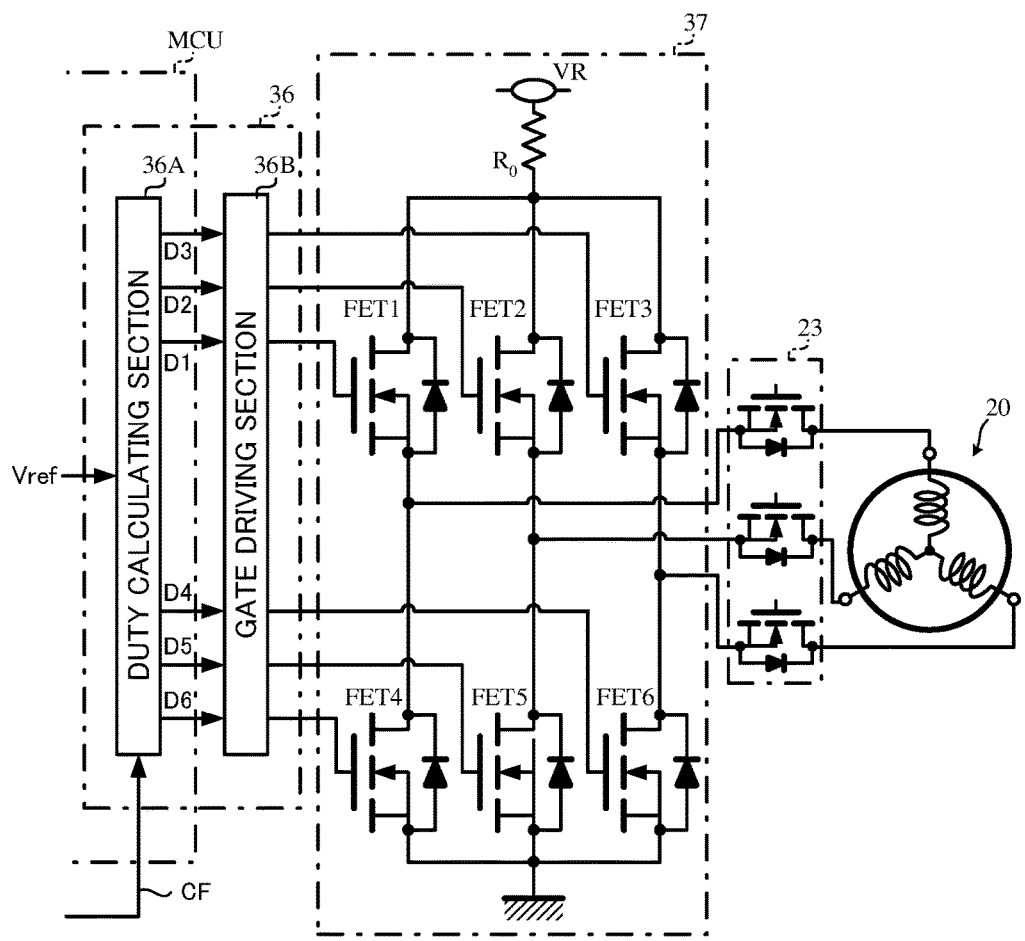
FIG. 3 is a circuit diagram showing a configuration example of a general PWM-control section and an inverter.
Figure 4:
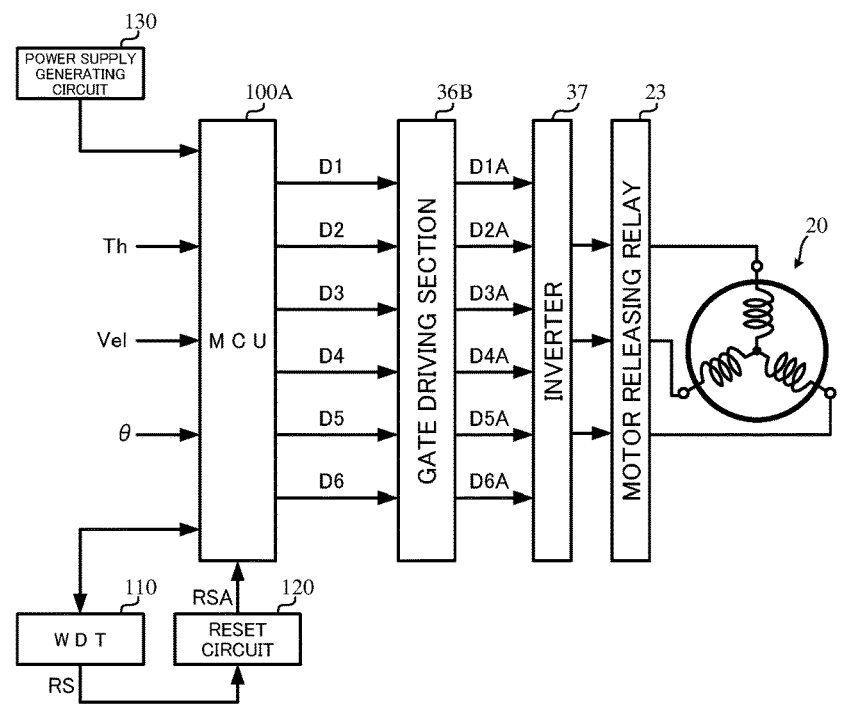
FIG. 4 is a circuit diagram showing a configuration example of the inverter having a conventional protection function.
Figure 5:
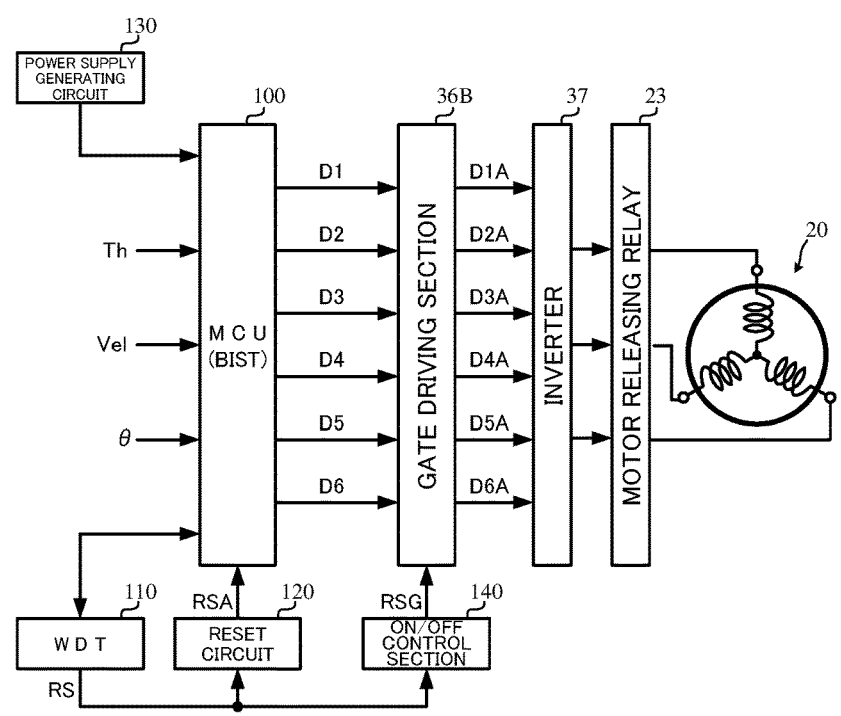
FIG. 5 is a block diagram showing a configuration example of the present invention.

As shown in FIG. 5 corresponding to FIG. 4, in the present invention, an MCU 100 having the BIST function performs an overall control. The electronic control unit comprises an external WDT 110 that detects the abnormality of the MCU 100, a reset circuit 120 that resets the MCU 100 on the basis of a reset signal RS which the external WDT 110 outputs, and an ON/OFF control section 140 that outputs a gate signal RSG which turns gates of a gate driving section 36B on or off on the basis of presence or absence of the reset signal RS.

Figure 6:
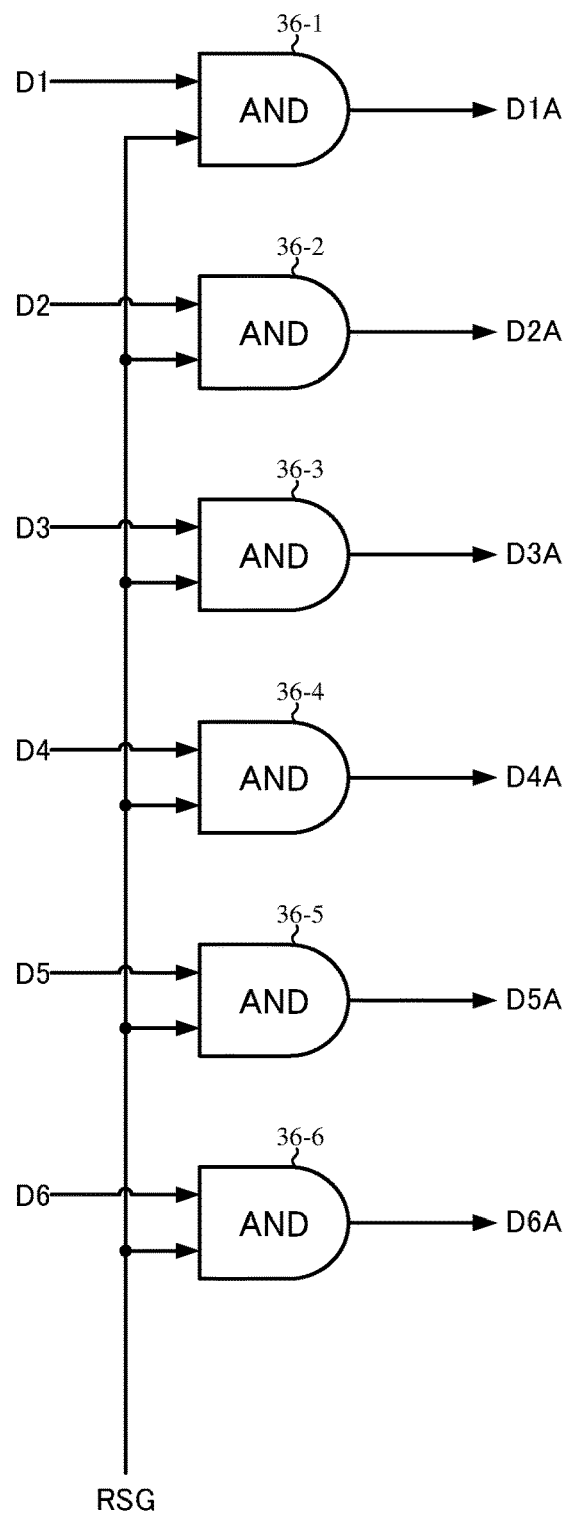
FIG. 6 is a block diagram showing a configuration example of a gate driving section.

As shown in FIG. 6, in the gate driving section 36B, duty signals D1 to D6 from the MCU 100 input into "AND" circuits 36-1 to 36-6 respectively. The gate signal RSG is also inputted into the "AND" circuits 36-1 to 36-6. Since the "AND" circuits 36-1 to 36-6 output driving signals D1A to D6A under an "AND" condition, when the gate signal RSG is inputted, the outputs of the driving signals D1A to D6A from the "AND" circuits 36-1 to 36-6 are all OFF, and the inverter is stopped driving. When the gate signal RSG is not inputted into the "AND" circuits 36-1 to 36-6, the calculated duty signals D1 to D6 are outputted as the driving signals D1A to D6A from the "AND" circuits 36-1 to 36-6, and the inverter is driven by using the duty signals D1 to D6.

Figure 7:
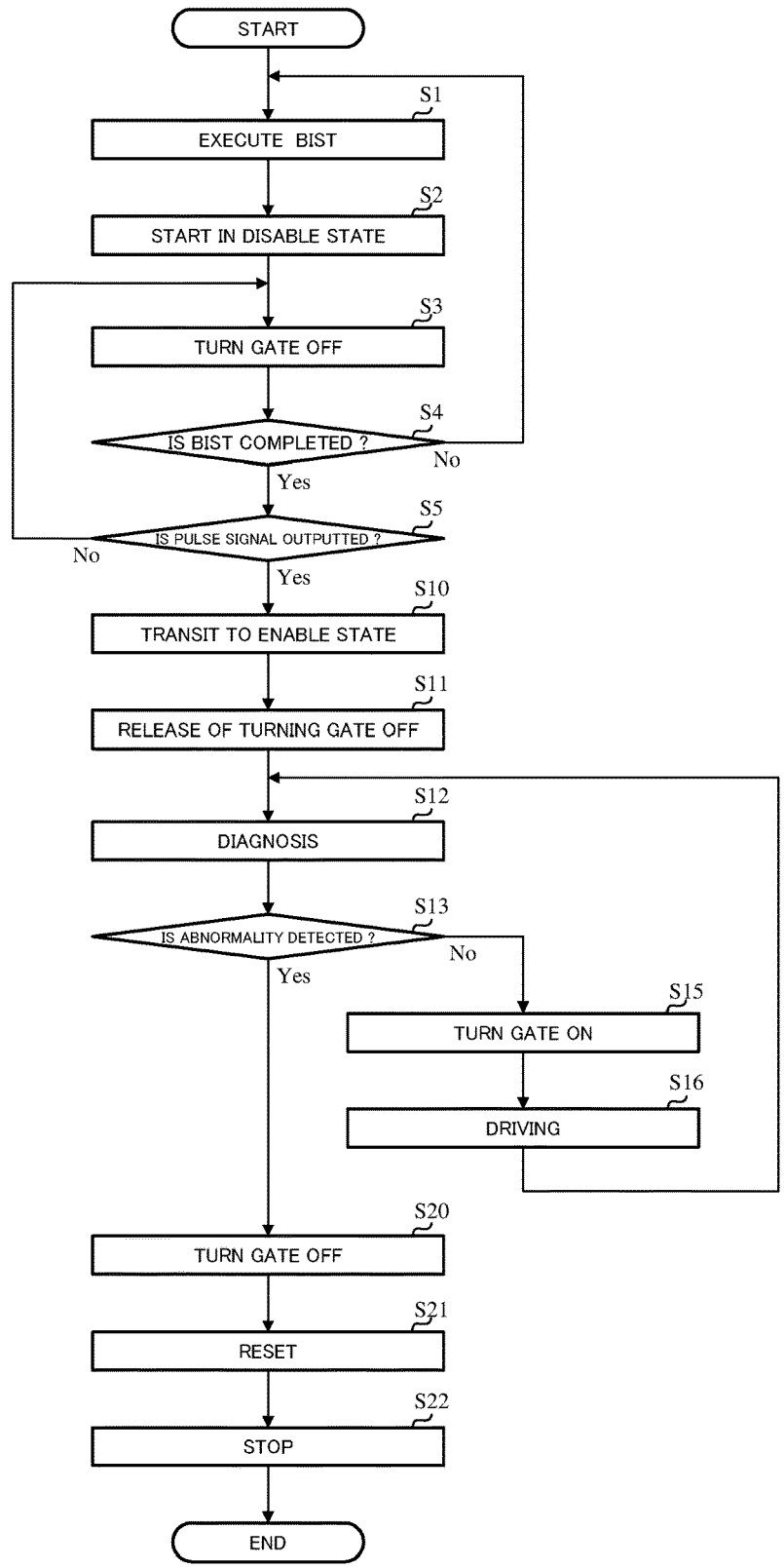
FIG. 7 is a flowchart showing an operating example of the present invention.

In such a configuration, an operating example will be described with reference to a flowchart of FIG. 7.

When starting the power supply, the MCU 100 executes a hardware BIST that checks whether a safety function incorporated in the MCU 100 normally operates or not (Step S1). Because software cannot operate during executing the hardware BIST, terminals of the MCU 100 are initial setting states during the BIST. On the other hand, in order to prevent from erroneous detection due to not detecting the signals from the MCU 100 during executing the BIST of the MCU 100, the external WDT 110 starts in the disable state (Disable) (Step S2), outputs the gate signal RSG to the gate FET driving section 36B via the ON/OFF control section 140, and stops the driving of the inverter 37 by turning the FET1 to the FET6 off (Step S3).

After completing the hardware BIST (Step S4), when the software normally operates, the pulse signal having a constant period, which indicates that the MCU 100 normally operates, is outputted from the MCU 100 to the external WDT 110 (Step S5). In a case that the external WDT 110 detects the pulse signal having the constant period and can judge that the MCU 100 normally operates, the function of the external WDT 110 transits from the disable state (Disable) to the enable state (Enable) (Step S10), the gate signal RSG is released via the ON/OFF control section 140 (Step S11), and the external WDT 110 continues diagnosing the operation of the MCU 100 (Step S12).

After the external WDT 110 transits to the enable state (Enable), in a case that the abnormality of the MCU 100 is not detected and the MCU 100 normally operates, the gate signal RSG is set to "gate ON" via the ON/OFF control section 140 (Step S15), the inverter 37 is driven (Step S16), and the above driving operation is continued.

On the other hand, in a case that the MCU 100 is failed and cannot detect the pulse signal having the constant in the above Step S13, the external WDT 110 detects the abnormality of the MCU 100. When the external WDT 110 detects the abnormality of the MCU 100, the WDT 110 outputs the reset signal RS, the gate signal RSG is set to "gate OFF" via the ON/OFF control section 140, and the driving of the inverter 37 is stopped by turning the FET1 to the FET6 off (Step S20). Further, the MCU 100 is reset via the reset circuit 120 (Step S21), and the driving is stopped (Step S22).

In a case that the MCU 110 is failed or is abnormal when starting the power supply and the MCU 110 abnormally operates, since the software cannot normally operate regardless of whether the BIST is executed or not, the MCU 100 cannot output the pulse signal having the constant period (Step S5). Then, the external WDT 110 does not transit from the disable state (Disable) to the enable state (Enable), and the gates continue to be turned off by the gate signal RSG (Step S3).

As described above, even in a case that the external WDT 110 is the disable state (Disable) and the failure of the MCU 100 is occurred, since the gates are turned off by the gate signal RSG and the output driver is stopped, there exists the effect that the system can maintain the safety. The pulse signal from the MCU 100 is used for judging whether a condition that the external WDT 110 transits to the enable state (Enable) is satisfied or not. Since the external WDT 110 can transit to the enable state (Enable) (release of the gate signal RSG) by confirming that the MCU 100 normally operates, there exists the effect that the FET driving and the motor driving can be safely initiated. In the present embodiment, the pulse signal having the constant period from the MCU is used for judging whether a condition that the external WDT transits to the enable state (Enable) is satisfied or not. Alternatively, a control terminal for setting the disable state (Disable) or the enable state (Enable) is disposed in the external WDT, and the MCU may operate the control terminal. As another method, the disable state (Disable) or the enable state (Enable) in the external WDT may be set by serial peripheral interface (SPI) communication.

The electronic control unit of the present invention is not limited to use the electric power steering apparatus, and can be applied to, for example, a vehicle-mounted control device, and a general electronic control unit that drives the motor or the actuator.

Further, as described above, the MCU itself has the BIST function. The MCU that cooperates with the circuit having the BIST function may be used.

EXPLANATION OF REFERENCE NUMERALS 1 handle (steering wheel)
2 column shaft (steering shaft, handle shaft)
10 torque sensor
12 vehicle speed sensor
13 battery
20 motor
23 motor opening switch
30 control unit (ECU)
31 current command value calculating section
35 PI-control section
36 PWM-control section
37 inverter
100 micro controller unit (MCU)
110 watch dog timer (WDT)
120 reset circuit
130 power supply generating circuit
140 ON/OFF control section

The invention claimed is:

1. An electronic control unit that is controlled by a micro controller unit (an MCU) via an inverter constituted by a semiconductor switching device, comprising:
   an external watch dog timer (WDT) to detect an abnormality of said MCU,
   a reset circuit to reset said MCU when said external WDT detects said abnormality of said MCU, and
   an ON/OFF control section to turn a gate of said semiconductor switching device on or off in accordance with said external WDT,
   wherein said MCU has a built-in self-test (BIST) function or said MCU cooperates with an external circuit having said BIST function,
   wherein said external WDT is initiated in a disable state, and said inverter is stopped by turning said gate off via said ON/OFF control section when said external WDT is in said disable state,
   wherein said external WDT comprises a control terminal for said disable state an enable state, and transits to said enable state by operating said control terminal from said MCU, and
   wherein when said abnormality of said MCU is not detected in said enable state to which said external WDT transits from said disable state, said inverter is driven by turning said gate on via said ON/OFF control section, and when said abnormality of said MCU is detected, said inverter is stopped by turning said gate off via said ON/OFF control section and said MCU is reset by said reset circuit.

2. The electronic control unit according to claim 1, wherein said semiconductor switching device is a field effect transistor (an FET).

3. An electric power steering apparatus that is equipped with said electronic control unit according to claim 1, drives and controls a motor by said MCU via said inverter based on a current command value served as a steering command, and applies an assist torque to a steering system of a vehicle by said motor.

4. An electric power steering apparatus that is equipped with said electronic control unit according to claim 2, drives and controls a motor by said MCU via said inverter based on a current command value served as a steering command, and applies an assist torque to a steering system of a vehicle by said motor.

* * * * *